(12) United States Patent  (10) Patent No.: US 9,116,065 B2
Andreaus  (45) Date of Patent: Aug. 25, 2015

(54) IONIZATION VACUUM MEASURING CELL

(75) Inventor: Bernhard Andreaus, Raperswil (CH)

(73) Assignee: INFICON GMBH, Bad Ragaz (CH)

( * ) Notice: Subject to any disclaimer, the term of this patent is extended or adjusted under 35 U.S.C. 154(b) by 44 days.

(21) Appl. No.: 14/237,007

(22) PCT Filed: Aug. 2, 2012

(86) PCT No.: PCT/CH2012/000177
§ 371 (c)(1),
(2), (4) Date: Feb. 20, 2014

(87) PCT Pub. No.: WO2013/033851
PCT Pub. Date: Mar. 14, 2013

(65) Prior Publication Data
US 2014/0176150 A1  Jun. 26, 2014

(30) Foreign Application Priority Data
Sep. 8, 2011 (CH) ..................... 1483/11

(51) Int. Cl.
*G01L 21/34* (2006.01)
*H01J 41/06* (2006.01)
*G01L 21/30* (2006.01)

(52) U.S. Cl.
CPC .............. *G01L 21/30* (2013.01); *G01L 21/34* (2013.01); *H01J 41/06* (2013.01)

(58) Field of Classification Search
CPC ........... G01L 21/34; G01L 21/30; H01J 41/06
USPC ........................... 324/459, 460, 463
See application file for complete search history.

(56) References Cited

U.S. PATENT DOCUMENTS 5,568,053 A * 10/1996 Drubetsky et al. ............ 324/463
2002/0159891 A1* 10/2002 Shen ............................... 417/50
2006/0197457 A1* 9/2006 Vukovic et al. ........... 315/111.41

FOREIGN PATENT DOCUMENTS

EP  0611084  8/1994

* cited by examiner

*Primary Examiner* — Jermele M Hollington
*Assistant Examiner* — Raul Rios Russo
(74) *Attorney, Agent, or Firm* — Notaro, Michalos & Zaccaria P.C.

(57) ABSTRACT

An ionization vacuum measuring cell has: a) an evacuatable housing (10) with a measuring connection (8) for the vacuum to be measured, b) a first outer and a second inner electrode (3, 4) which are coaxially arranged in an interspaced manner with a common axis (7), whereby a measuring chamber (20) is formed between the two electrodes, the measuring chamber communicating with the measuring connection (8), c) a voltage source (16) which is connected to the electrodes (3, 4), d) a current measuring mechanism (17) for analyzing a discharge current generated between the electrodes (3, 4), and e) at least one permanent magnet ring (1) which surrounds the coaxial electrode (3, 4) arrangement, has a magnetizing direction (13) directed radially to the axis, and has a soft-magnetic yoke (2) that surrounds the permanent magnet ring (1).

17 Claims, 7 Drawing Sheets

IONIZATION VACUUM MEASURING CELL

Figure 1A:
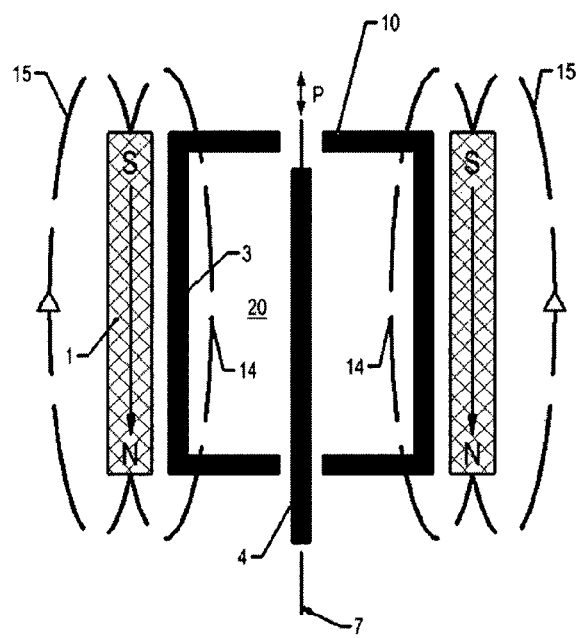

The present invention relates to an ionization vacuum measuring cell according to the preamble of claim 1.

Conventionally, gas pressure measuring cells are used for vacuum measurements, based on the principle of gas discharge by using a cold cathode. Such measuring cells are also called code cathode ionization vacuum gauge or penning cells. In such measuring cell, a sufficiently high DC voltage is applied between two electrodes (anode, cathode), therefore gas discharge can be ignited and maintained. Resulting therefrom, the discharge current is a quantification of the pressure to be measured.

A magnetic field formed in the area of the discharge path guides the electrons along their path from the negative electrode (cathode) to the positive electrode (anode) along helical paths, resulting to an extended electron path. Therefore, the degree of probable hits on gas particles is increased as well as the degree of ionization is improved. This ensures the discharge can burn across wide pressure ranges and shows stable and reproducible behavior.

Vacuum gauges operating on the principle of gas discharge by using cold cathodes can be roughly divided into three classes, which differ mainly in the configuration of the electrodes:

1. Penning-Cell:

The anode is formed as an annular cylinder surrounding the discharge space, wherein cathode plates are arranged on both end faces of the anode ring. The magnetic field lines extend parallel to the axis of the anode ring.

2. Magnetron-Cell:

The anode is formed as a hollow cylinder having a central axis, wherein the cathode is formed as a rod arranged in the center or rather along the axis. Therefore, the field lines of the electric field extend radially. The magnetic field lines extend parallel to the cylinder axis.

3. Cell Having Inverted Magnetron Arrangement:

The cylinder design equals that of the magnetron-cell, except that the anode is arranged as a rod like arrangement in the center and that the cathode is formed as the hollow cylinder. The end faces of the cylinder are typically biased to cathode potential, as well. As with the magnetron, the magnetic field lines run parallel to the cylinder axis, wherein the field lines of the electrical field extend radially.

The space accessible for the gas to be measured, which space in the inverted magnetron is surrounded by the cathode, which space in the magnetron is surrounded by the anode, is also called ionization space.

The design most commonly used is that of the inverted magnetron, since in high vacuum it generally achieves a more stable measurement signal as compared to the penning-cell, at low pressures the discharge can be ignited easier, and at lower pressures the lower measurement range can be achieved to result in the range as low as $10^{-11}$ mbar.

In gauges, the magnetic field in the direction to the cylinder axis, required to maintain the gas discharge, is induced by permanent magnets due to the required field strengths in the range of up to $10^{-1}$ T (=1000 Gs), the power consumption of solenoids would be too large, and the solenoids would occupy too much space. Magnet configurations for inverted magnetron-cells according to the prior art are as follows:

A) A ring magnet having axial magnetization, as depicted schematically and exemplarily in FIG. 1a.

Figure 1B:
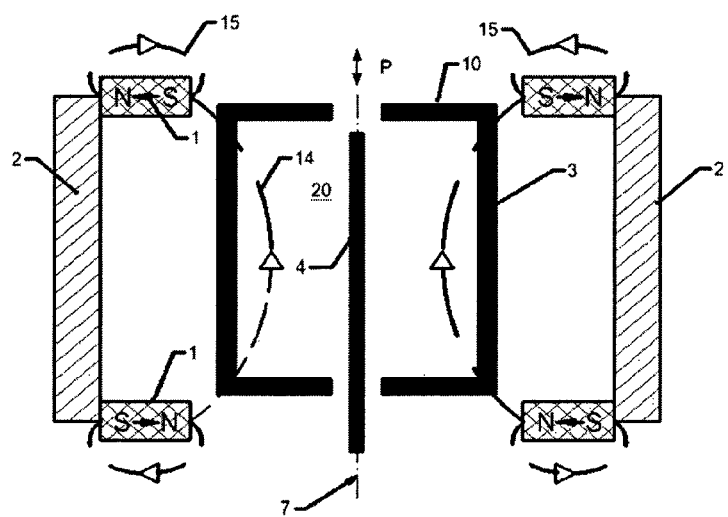

B) Two ring magnets having radial magnetization, as depicted schematically and exemplarily in FIG. 1b.

Figure 1C:
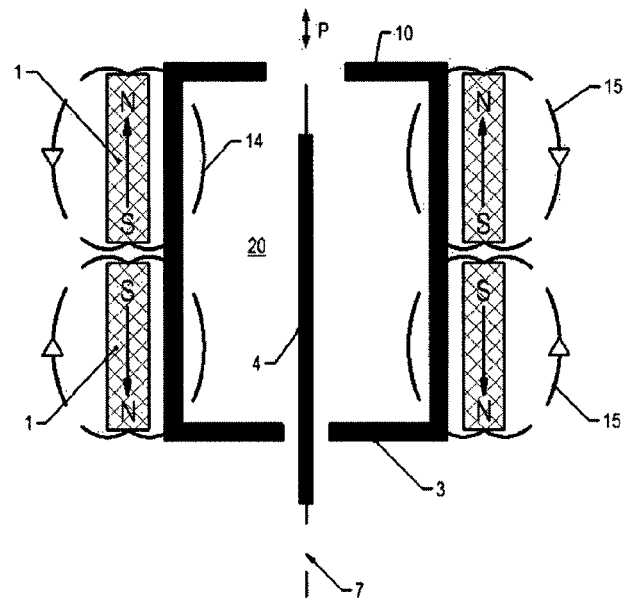

C) Two ring magnets having axial magnetization, arranged to each other having reversed polarity, as depicted schematically and exemplarily in FIG. 1c.

The version (A) is the classical version, being preferable in that such annular magnets 1 having axial magnetization can be manufactured easily with low costs. In combination with suitable baffles made of soft magnetic material, homogeneous net field lines 14 can be achieved, and therefore magnetic flux densities can be achieved into the ionization space of the gauge. As mentioned above, the cathode 3 is formed cylindrically and surrounds the discharge space or rather a measuring chamber 20. The anode 4 is arranged along the axis of the cylindrically cathode 3. The whole is enclosed by the annular permanent magnet 1 having its polarity in the orientation axial to the axis 7. In FIG. 1a the North Pole is denoted by N and the South Pole is denoted by S. Within in this arrangement, the polarities can be interchanged, respectively. On the end face side, the cylindrically cathode, which is oriented in the direction to the axis 7, can comprise additionally electrode faces, biased to the same potential and further adopted to reflect the electrons back to the discharge space. The discharge space comprises at least one opening connected to the outside to the vacuum space P to be measured. Typically, at this point, such measuring cell is formed as a detachable flange connection.

The version (B) comprises two radially magnetized rings spaced apart from each other in the axial direction, which are connected by an annular yoke 2 made of soft magnetic material, in order to provide magnetic feedback or rather back iron of the magnetic circuit. Compared to version (A), the version (B) provides for less stray fields 15 to the outside, in particular in the radial direction. A part of the generated magnetic field 15, forms closed loops outside the ionization space and creates a stray field 15, wherein the latter does not contribute to the net field 14. Such external stray fields 15 are disadvantageous since they can interfere with equipment and processes arranged in this place. The version (B) comprising reduced stray field 15 to the outside is thus advantageous in this respect. This also means that less permanent magnet material is needed into the ionization space relating to the same densities.

Document EP 0 611 084 A1 from Lethbridge, disclosing the version (B), proposes to use ring segments rather than radially magnetized rings; that ring segments are adapted to generate a radially directed field.

The version (C) was proposed by Drubetsky and Taylor, U.S. Pat. No. 5,568,053. This version results to a field which changes the direction with respect to the cylinder axis at the height in-between both magnetic rings. Having regard to the cylinder axis, the field in this area equals zero, since the flux densities of both magnets cancel each other. Compared to the version (A), the advantage of this arrangement is in the reduced stray field having regard to determined requirements in view to flux density in the measuring chamber. However, the stray field is still present appreciable and has the potential to interfere, especially in the case of a strong net field has to be generated into the measuring chamber, wherein the outer stray field gets stronger and still enters to the outside.

A disadvantage of version (A) is due to the relatively high flux densities extending to the outside of the ionization chamber and even extending to the outside of the entire measuring cell arrangement, appearing as stray fields 15 there, as depicted in FIG. 1a. This has adverse effects on devices and processes arranged in next proximity, which can take place in close proximity to the measuring cell in case of a typical application, in particular relating to processes operated with charge carriers or ionized gas.

Application of version (B) results to reduced stray fields 15, since a magnetic circuit (in German: magnetischer Schluss) is created outside the ionization chamber, in between both annular magnets 1, due to the provision of a baffle 2 or rather a yoke made of soft magnetic material. However, significant disruptive external stray fields 15 are still created at each of both annular magnets 1, due to the magnetic shunt (in German: magnetischer Nebenschluss) between poles N, S, as depicted in FIG. 2b.

In version (C) the gas discharge by means of the reduced magnetic flux density in the center, on the level of in-between both annular magnets, wherein this magnetic flux density is no longer directed perpendicular to the electric field axis, is low, and hence, a part of the measuring cell volume remains unused. Additionally, resulting from the magnetic shunt on the outside of the magnets, a non-negligible interfering stray field 15 is created, as depicted in FIG. 1c, having approximately the effect similar to that as explained in relation to version (A) according to FIG. 1a.

It is an object of the present invention to eliminate the disadvantages relating to the prior art. In particular, it is an object of the present invention to provide a magnetic field configuration for a cold cathode-ionization-vacuum measuring cell, which comprises a magnetron arrangement, and in which interfering magnetically stray fields outside the measuring cell are reduced significantly or are even eliminated completely in essential. Further, the measuring cell should be able to detect a large range of pressure to be measured and should operate reliable and reproducible. Further, the cell is required to be manufactured compactly and with reduced costs.

Relating to the ionization vacuum measuring cell this object is achieved according to features of the characterizing part of present patent claim 1. Dependent patent claims are directed to further advantageous embodiments of the present invention.

The ionization vacuum measuring cell according to the present invention comprises:
a) an evacuatable housing having a measuring connection relating to the vacuum to be measured,
b) a first and second electrodes, which are arranged to each other essentially in a coaxial and spaced apart relationship, and comprising a common axis, wherein a measuring chamber is formed between the both electrodes, said measuring chamber communicating with the measuring connection, wherein the first electrode forms the outer electrode comprising a substantially cylindrical surface,
c) a voltage source connected to the electrodes,
d) a current measuring means for analyzing a discharge current generated between the electrodes, the discharge current constituting a function relating to the vacuum pressure to be measured,
e) at least one permanent magnet ring surrounding the coaxial electrode arrangement, having a magnetization direction substantially radially to the axis, and comprising a soft-magnetic yoke surrounding the permanent magnet ring, wherein said yoke extends axially away from the permanent magnet ring on both sides, and extends in radially direction towards the axis and the first electrode on both sides upon a predetermined distance d from the permanent magnet ring, wherein said first electrode forms the outer electrode of the coaxial arrangement of the electrodes, such that the yoke forms two annular poles on both sides of the permanent magnet ring and spaced apart therefrom, from which at least a part of the field lines of the permanent magnet ring forms a closed loop within the measuring chamber, penetrating the first electrode, wherein, in particular, inside the measuring chamber an annular tunnel-like magnetic field on top of the first electrode is generated.

The arrangement comprising the magnetic system forms a magnetron. In certain conditions, the first outer electrode can be actuated as anode, wherein the second inner electrode can be actuated as cathode. However, the much more preferred arrangement is formed by an inverted magnetron. Therefore, the outer first electrode is actuated as cathode and the coaxial inner electrode is actuated as anode. In this arrangement, called an inverted magnetron, the discharge efficiency is much better and more stable. The anode, which is preferably arranged in the center, is preferably formed rod-like.

Thus, the magnetic system always comprises soft magnetic material in the outer area. The magnetic loop between the poles on both sides extends across the soft magnetic material. Therefore, the magnetic system is prevented to generate an interfering stray field towards the outside or this generation can be minimized at least. However, inside the ionization chamber, at least two annular tunnel-like, magnetic field configurations directed to the inside are generated across the surface of the first electrode having axial components, respectively. The field lines extend from the inner pole of the at least one permanent magnet to the inside and penetrate the first electrode, wherein the field lines are closed on both sides of the magnet across the poles of the soft magnetic yoke, by penetrating the first electrode in turn. In doing so, inside the ionization chamber, on a level of the magnet, the field lines are changing the direction, resulting in both adjacent tunnel-like fields, relating to their polarity, extend opposed to each other. Therefore, at least two adjacent annular, torus-like discharges arise on top of the first electrode. When viewed in the cross section, the electrons rotating inside, oscillate laterally across the field lines and rotate circularly inside the rings in opposite directions, hence causing an increased grade of ionization due to the dwell time being extended as a result of this, typically for the magnetron effect in case of a well magnetron arrangement of the present case.

In the following, the invention is described schematically and exemplary with respect to the drawings.

Figure 2A:
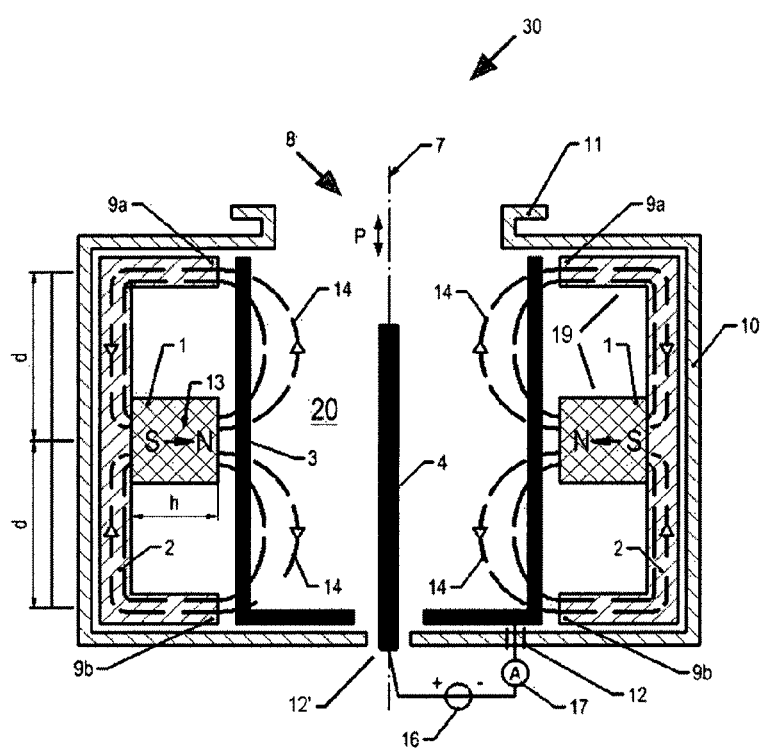
Figure 2B:
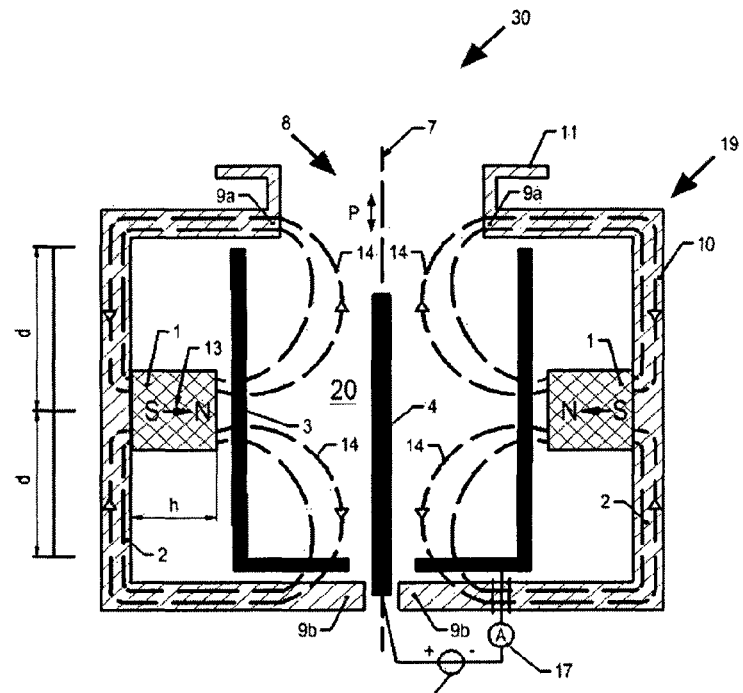
Figure 2C:
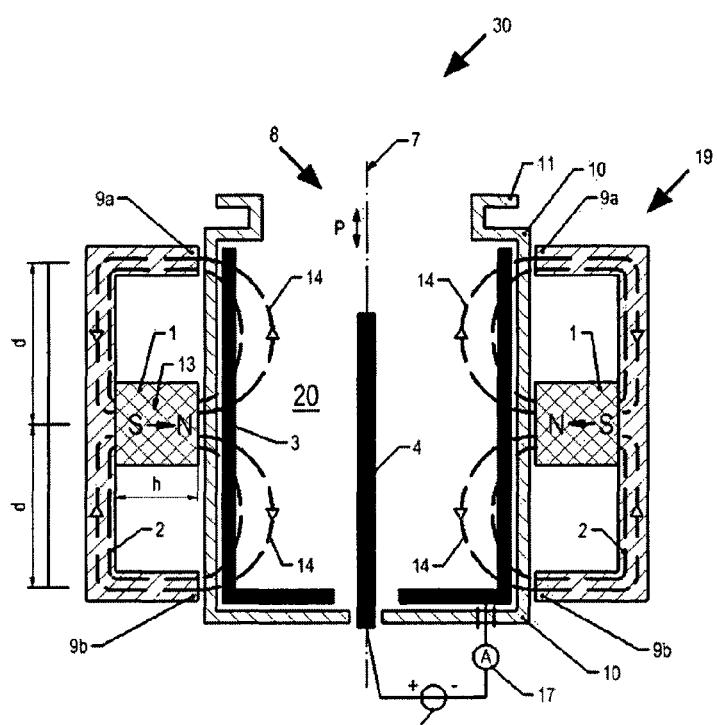
Figure 2D:
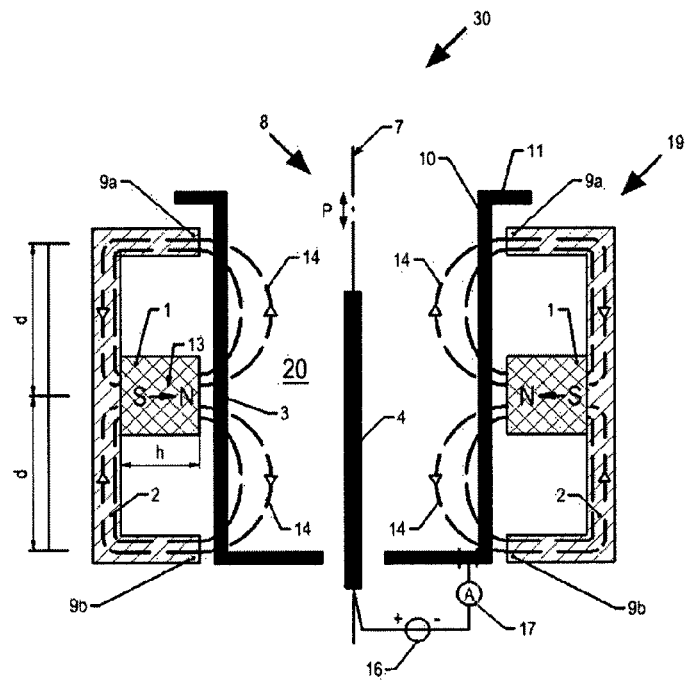
Figure 2E:
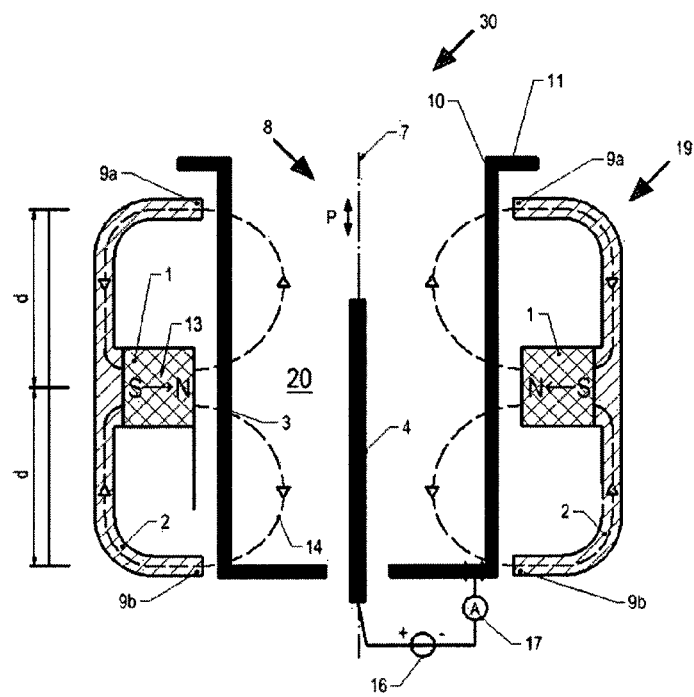
Figure 3:
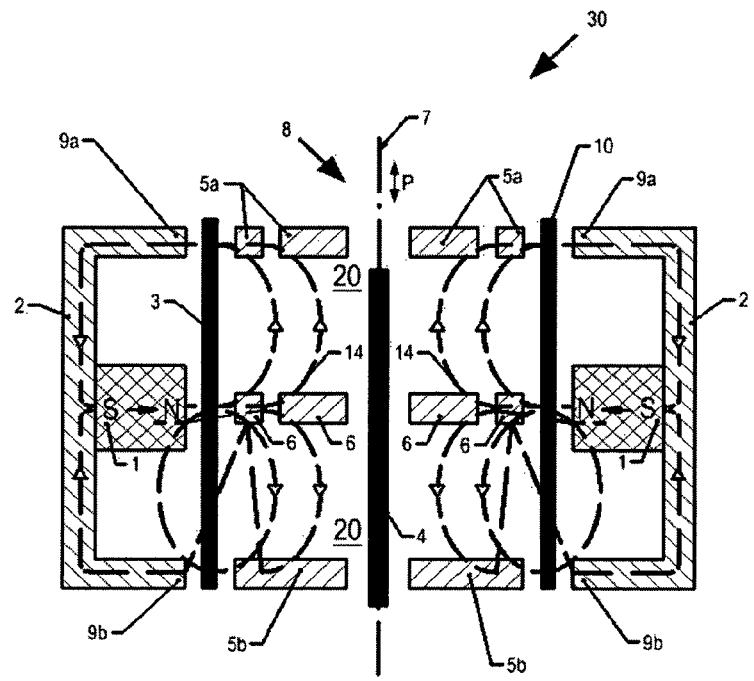
Figure 4:
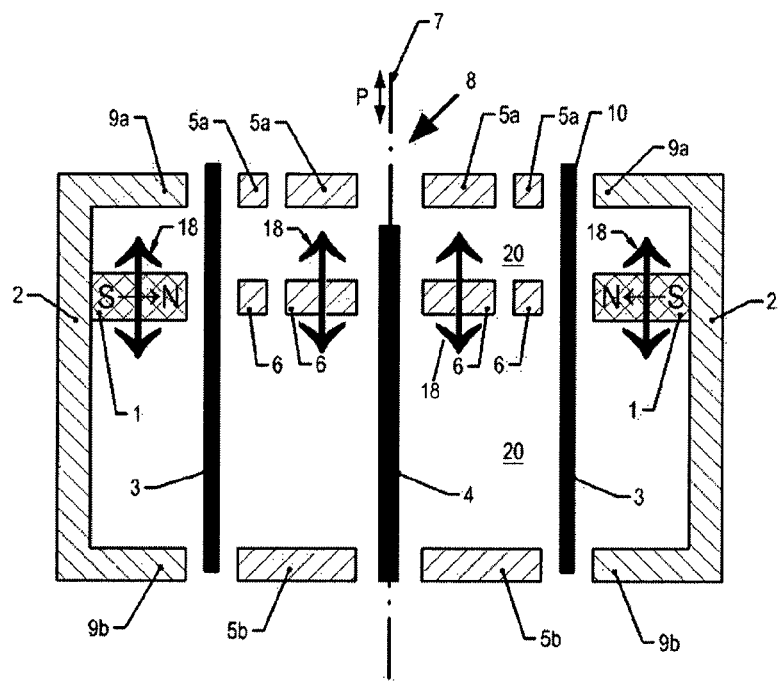
Figure 5A:
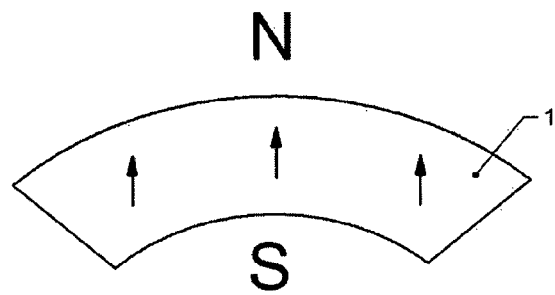
Figure 5B:
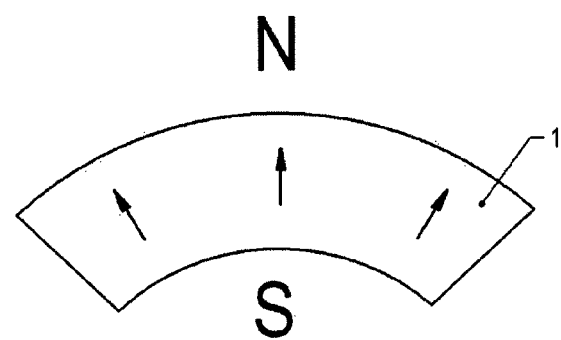
Figure 5C:
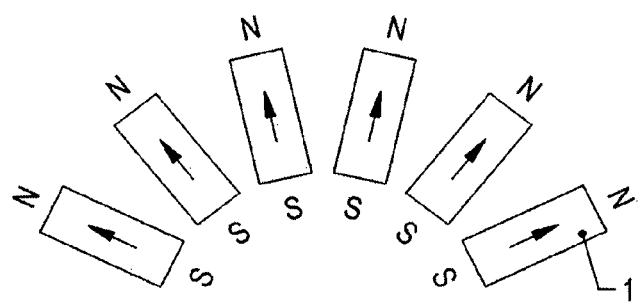
Figure 6A:
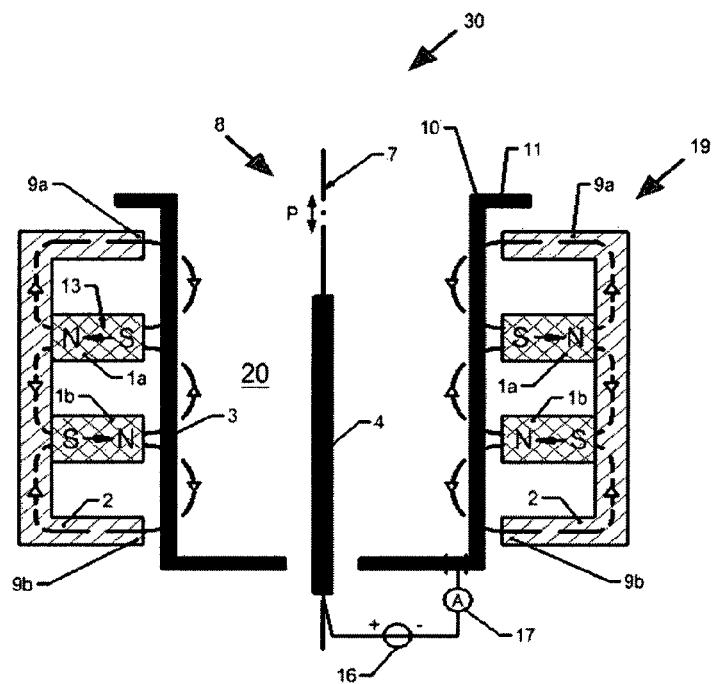
Figure 6B:
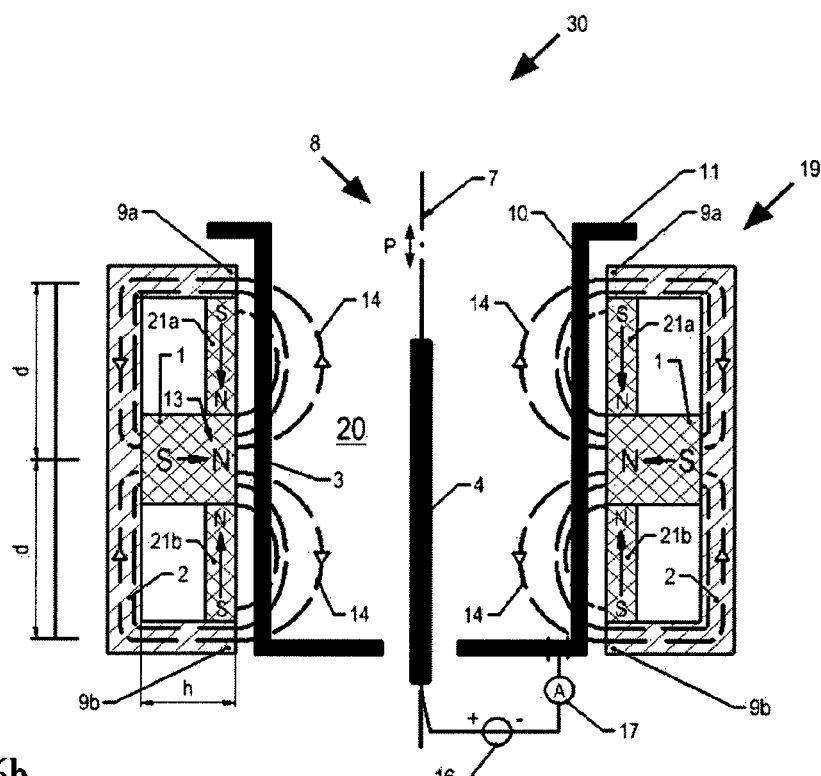

In the drawings:

FIG. 1a shows a magnetron ionization vacuum measuring cell comprising an annular magnet having axial magnetization according to the prior art, in a cross sectional view, FIG. 1b shows a magnetron ionization vacuum measuring cell comprising two annular magnets spaced apart from each other in axial direction, having radial magnetization, surrounding an outer surrounding soft magnetic yoke, in a cross sectional view, FIG. 1c shows a magnetron ionization vacuum measuring cell comprising two annular magnets having axial magnetization, arranged to each other counter-pole-like and abutting on each other, according to the prior art, in a cross sectional view, FIG. 2a shows a magnetron ionization vacuum measuring cell comprising an annular magnet having radial magnetization, and a surrounding soft magnetic yoke arranged on the outer side, comprising leg-like areas on both sides of the annular magnet and being spaced apart from this, each forming annular poles, directed towards a first electrode, wherein a vacuum housing surrounds and encompasses the whole arrangement of the measuring cell, according to the present invention, in a cross sectional view, FIG. 2b shows a further embodiment of a vacuum measuring cell, wherein the vacuum housing is formed by the yoke itself, FIG. 2c shows a further embodiment of a vacuum measuring cell, wherein the vacuum housing is arranged between the first electrode and the arrangement of the magnetic system, such that the magnetic system comprising the permanent magnet and the yoke is arranged outside the vacuum chamber in atmosphere, FIG. 2d shows a further embodiment of a vacuum measuring cell, wherein the vacuum housing is formed as a first electrode as well, such that the magnetic system comprising the permanent magnet and the yoke is arranged outside the vacuum chamber in atmosphere, FIG. 2e shows a further embodiment of a vacuum measuring cell, wherein the leg-like areas, having the poles bended, are extended in the direction towards the first electrode, FIG. 3 shows a further embodiment of a vacuum measuring cell, wherein soft magnetic conductive means are arranged in the center area of the measuring cell on top of the poles of the yoke and/or the pole of the annual magnet, in a cross sectional view, FIG. 4 shows a further embodiment of a vacuum measuring cell, wherein the annular magnet and/or the soft magnetic conductive means comprised by the pole are arranged inside the arrangement of the yoke such to be asymmetrical and/or adjustable in axial direction, in a cross sectional view, FIG. 5a shows a segment forming a part of an assembled annular magnet, wherein the direction of magnetization is directed perpendicular to the bowstring of the segment, in a plan view, FIG. 5b shows a segment forming a part of an assembled annular magnet, wherein the direction of magnetization is directed in radial direction, in a plan view, FIG. 5c shows a partial view of an annular magnet assembled from single bar magnets, wherein the single bar magnets are magnetized in the same direction, in a plan view, FIG. 6a shows a further embodiment of a vacuum measuring cell, illustrating, inside the arrangement of the yoke, two annular magnets spaced apart from each other in axial direction, in a cross sectional view, FIG. 6b shows a further embodiment of a vacuum measuring cell, wherein, inside the arrangement of the yoke, further annular magnets having axial polarization are each arranged on both sides of the pole of the annular magnet being magnetized in radial direction, and which are further arranged in a counter-pole fashion and directed to the axis, in cross directional view.

FIG. 2a shows in an exemplary schematic view a first embodiment of an ionization vacuum measuring cell 30 comprising a magnetron magnetic field arrangement 19 according to the invention, depicted in a cross sectional view.

A housing 10 comprises a measuring connection 8 adapted to be connected to the vacuum to be measured, by means of which the housing 10 can be evacuated appropriately. The housing 10 and the vessel comprising the vacuum to be measured can be connected by means of a sealing flange, for example. The vacuum measuring cell 30 comprises the housing 10 including two electrodes 3, 4 and a magnetic system 19, enclosed by the housing 10 in the present embodiment. The magnetic system 19 includes a permanent magnet ring 1 and a yoke 2 comprising soft magnetic material. The soft magnetic material can be made of metallic materials (ferromagnetic materials) as well as ceramic materials, for example ferrites.

The first and a second electrodes 3, 4 are arranged substantially coaxially and spaced apart from each other, comprising a common axis 7. Therefore, a measuring chamber 20 is formed in-between these two electrodes. The measuring chamber 20 is arranged such to be connected to the measuring connection 8. The first electrode 3 forms the outer electrode and comprises a substantially cylindrically surface. The second electrode 4 can be formed cylindrically as well, however, preferably, the second electrode 4 is formed rod-like and is preferably arranged in the center, i.e. across the axis 7.

Both electrodes can be energized via vacuum-tight electrically feed-troughs 12, 12' on the housing 10. In doing so, a voltage source 16 is connected to the electrodes 2, 3. Current measuring means 17 are adopted to evaluate the discharge current, i.e. the discharge formed across the electrodes 3, 4. This discharge current corresponds to a function of the vacuum pressure to be measured, is evaluated electrically and is supplied for further application.

At least one permanent magnet ring 1 encompasses the coaxial arrangement of the electrodes 3, 4, having a direction of magnetization 13 directed essentially radially in relation to the axis. This permanent magnet ring 1 is further encompassed by means of a yoke 2, made of soft magnetic material, in order to conduct the magnetic field. On both sides of the permanent magnet ring 1, the yoke 2 is led away in axial direction, and is led to the axis 7 and the first electrode 3 after passing a predetermined distance d from the permanent magnet ring 1 on both sides in radial direction. Therefore, in cross sectional view, a U-shaped yoke is formed, which forms poles 9a and 9b on both sides of the permanent magnet ring 1 and in a spaced apart relation therefrom. In this regard, the first electrode 3 forms the outer electrode out of the coaxial arrangement of the electrodes 3, 4. At least a part of the field lines of the permanent magnet ring 1, i.e. the net field lines 14 predetermined with respect to the discharge, are closed-circuited on top of the pole of the permanent magnet ring 1 and the associated one of the poles 9a, 9b of the yoke 2, inside the measuring chamber 20, penetrating the first electrode 3, wherein an annular, tunnel-like magnetic field 14 is formed on top of the first electrode 3 inside the measuring chamber 20, preferably. According to the arrangement shown in FIG. 1a, tunnel-like magnetic fields 14 are formed on both sides of the permanent magnet ring 1, respectively, i.e. two annular-like or rather torus-shaped magnetic fields 14 having polarities opposed to that of the distribution of the field lines.

Preferably, the outer first electrode 3 is operated acting as cathode, and the inner second electrode 4 is operated acting as anode.

The permanent magnet ring 1 is magnetized in radial direction and comprises preferably magnetic material selected from the group comprising rare earth, for example neodymium, samarium, etc. To simplify its manufacturing, the ring can be assembled from single parts, for example from segments and/or single square like magnets, which are to be aligned annular-like, as shown in FIGS. 5a to 5c. Resulting therefrom, the magnetization results as depicted by arrows, directed in uniform direction in case of the segment as depicted in FIG. 5a or directed in radial direction in case of the segment as depicted in FIG. 5b. As shown in FIG. 5c, single, for example square-like magnets are aligned to each other annular-like. Preferably, as compared to the width relating to a single part, the length h is increased in length. Preferably, the thickness of the magnet ring 1 is less than the width h.

In a cross sectional view, the shape of the U-shaped yoke 2, in which cross sectional the axis 7 extends, is formed to be at least partly angled, such that, on both sides of the permanent magnet ring 1, in axial direction, at a distance d, the thus formed legs of the yoke 2 are directed to the measuring cell 30, in radial direction to the axis 7, forming ring like poles 9a, 9b in this location, respectively, directed towards the first electrode 3. Preferably, the angular offset is formed rectangular, as depicted in FIGS. 2a to 2d, 3, 4 and 6. Preferably, the poles 9a, 9b of the yoke and the inner pole of the permanent magnet ring are spaced apart from each other at equal distances in relation to the axis 7. However, in certain cases, the poles mentioned above can be offset mutually, as depicted in FIG. 2b, for example. As shown in this Figure, in the lower part, the pole 9b of the yoke 2 protrudes to the axis 7. Preferably, all poles are arranged such to be in the vicinity of the area of the first electrode 3 as much as possible, to be able to conduct and use the magnetic field optimally. Preferably, the poles 9a, 9b of the yoke are arranged such that the magnetic field 14 penetrates the first electrode 3 in this location. Hence, the magnetic net field 14 extends from the pole of the permanent magnet ring 1 through the first electrode 3 and forms a closed loop on the top of both poles 9a, 9b of the yoke 2 inside the measuring chamber 20, by way of penetrating the first electrode 3 in turn. The conducting of the magnetic field through the first electrode 3 results to higher efficiency in discharging. In some cases, one or both poles 9a, 9b of the yoke 2 can be arranged such, that the field lines 14 penetrate the first electrode 3, partly or in no way, as shown in the upper area of the pole 9a in FIG. 2b, for example. The lower part of FIG. 2b shows the first electrode 3 angled towards the axis, such that the field lines 14 penetrate the first electrode 3 in this location in turn. Preferably, this angular offset is effected on both sides of the cylindrical first electrode 3. In this case, the first electrode 3 forms a kind of closed cylinder, comprising only one opening 8 for feeding the measuring gas P and means for supporting the second electrode inside the cylinder having an electrical feed-through for energizing the second electrode, if needed.

Apart from the angled design of the legs of the yoke 2, at least parts therefrom can be guided to the first axis 7 or to the electrode 3, in radial direction, at least partially arcuated, as depicted in FIG. 2e.

In the example shown in FIG. 2a, the elements of the measuring cell 30, the magnetic system 19 and the two electrodes 3, 4 are surrounded by a vacuum-tight housing 10. This housing 10 comprises an opening 8 and a port 11, preferably formed like a flange, by means of which the measuring cell 30 can be connected to the vacuum volume to be measured, realized in a sealed fashion. Preferably, this connection is formed as a detachable connection, allowing the measuring cell 30 to be exchanged as a component easily.

A further configuration of the measuring cell 30 in relation to the housing 10 is depicted in FIG. 2b. Here, the yoke 2 of the magnetic system is formed as a vacuum-tight housing 10, concurrently, comprising connecting means 11 arranged to it. However, the yoke 2 can be a part of the housing 10, solely. In this case, the housing 10 can be made of soft magnetic or ferromagnetic material, in some extend, and made of non-magnetic material, for example INOX, in another extend.

In a further version according to FIG. 2c, the housing 10 can be arranged between the first electrode 3 and the magnetic system 19, such that the magnetic system is positioned outside the housing 10 which encompasses the vacuum. Advantageously, the materials of the magnetic system 19 are prevented to add impurities or to contaminate the space of the measuring chamber 20, which would adversely affect the measurement results.

In the version shown in FIG. 2d, the first electrode 3 is shown as vacuum-sealed housing 10, simultaneously. Concerning the vacuum, this also allows to separate the magnetic system 19 from the measuring chamber 20, and allows a compact and easy implementation of the measuring cell 30, as well.

The permanent magnet ring 1 is allowed to be arranged inside the yoke 2 between its legs, having the poles 9a, 9b arranged such to extend in axial direction asymmetrically or even disposable, as shown in FIG. 4, wherein arrows 18 depict the direction of movement. In doing so, the characteristics of the magnet arrangement, and hence the discharge, can be affected specifically, or rather irregularities can be corrected as well. In most cases and as preferred, the permanent magnet ring 1 is arranged centrically in relation to the poles 9a, 9b of the yoke 2, such that the poles 9a, 9b of the yoke 2 are arranged symmetrically in relation to the permanent magnet ring 1.

The magnetic field, directed starting from the poles to the interior, can be affected by means of additionally conductive means, in order to further optimize discharge. As an example, in the area of the inner poles of the permanent magnet ring 1, ferromagnetic conductive means 6 can be arranged in radial direction towards the axis 7, as depicted in FIGS. 3 and 4. Also, in the area of at least one of the inner poles 9a, 9b of the yoke 2, ferromagnetic conductive means 5a, 5b can be arranged in radial direction towards the axis 7, for example. Such conductive means can be manufactured as metal plate parts and/or plates made of soft magnetic or rather ferromagnetic material, formed such to assume a disk like shape, for example. If needed, openings are provided in order to be allowed to feed the second electrode 4 through and/or to accomplish exchange of gases.

FIG. 6a depicts a further embodiment of the magnetic system 19, wherein two permanent magnet rings 1 are arranged inside the yoke 2 such to be spaced apart from each other in axial direction and arranged such to have opposing poles. Inside the measuring chamber 20, this arrangement generates a particular strong annular magnetron field between both poles of the permanent magnet rings 1 on top of the first electrode 3. Along both sides thereof, further annular fields are extending, respectively, which are closed or rather terminated by means of the two poles 9a, 9b of the yoke 2, such to prevent stray fields exiting to the outside. As a matter of course, two permanent magnet rings 1 can be provided, if necessary, the poles of which are arranged alternately, respectively, while usage of two permanent magnet rings 1 is preferred.

FIG. 6b shows a further embodiment of the magnetic system 19. Additional ring magnets 21a, 21b are arranged between the legs and the poles 9a, 9b of the yoke 2 and the permanent magnet ring 1, respectively, magnetized in axial direction, and arranged such to be directed towards the axis 7 inside the magnetic system. Preferably, the magnetic ring 21 comprises, in radial direction, a thickness, which equals half the width h of the permanent magnet ring 1 at maximum. Due to this arrangement, very high flux densities of the magnetic field tunnel can be achieved on top of the first electrode 3. As a matter of course, according to the embodiment relating to FIG. 6a as described above, preferably, such an annular magnet 21 can be arranged between two permanent magnet rings 1, as well.

The measuring cell 30 according to the invention described above is operated by applying a voltage of 3.3 kV applied across both electrodes 3, 4, i.e. across the cathode 3 and the anode 4. The preferred range for operating the measuring cell 30 is between 2.0 kV and 4.5 kV.

The following provides sizes of essential components.
The second electrode 4 (anode):
Anode length: 20 mm, for example, preferably in the range from 10 to 30 mm.
Anode diameter: 1.0 to 1.5 mm, for example, preferably in the range from 1.0 to 5.0 mm.

Material: Non-magnetic (also paramagnetic or diamagnetic).

The first electrode 3 (cathode):

Cathode length: 20 mm, for example, preferably in the range from 10 to 30 mm.

Cathode diameter: 20 to 25 mm, for example, preferably in the range from 15 to 35 mm.

Material: Non-magnetic (also paramagnetic or diamagnetic).

The permanent magnet ring 1:

Height in axial direction: 5.0 mm, for example, preferably in the range from 3.0 to 10 mm.

Width h in radial direction: 5.0 mm, for example, preferably in the range from 3.0 to 10 mm.

Magnetic Field:

The flux density across the cylinder axis, as measured inside the measuring chamber in axial direction, is in the range from 10 mT (mTesla) to 300 mT, preferably in the range from 60 to 130 mT.

Stray Field 15:

Less than 2.0 mT at a distance of 30 mm in radial direction from the outer corner of the measuring cell 30, preferably less than 0.5 mT.

Less than 2.0 mT at a distance of 30 mm from the front corner or rear corner in axial direction of the measuring cell 30, preferably less than 0.5 mT.

In both cases, it is not possible that the stray field assumes values as low as zero. In best cases, the smallest limit values obtainable equal approximately 0.01 mT corresponding to 0.1 Gauss at maximum, which is in the order of the geomagnetic field, if measured on earth surface level.

The invention claimed is:

1. An ionization vacuum measuring cell comprising:
   a) an evacuatable housing (10) having a measuring connection (8) relating to the vacuum to be measured,
   b) a first and second electrodes (3, 4), which are arranged to each other essentially in a coaxial and spaced apart relationship, and comprising a common axis (7), therefore a measuring chamber (20) is formed between both electrodes, said measuring chamber communicating with the measuring connection (8), wherein the first electrode (3) forms the outer electrode comprising a substantially cylindrical surface,
   c) the electrodes (3, 4) being adapted to be connected to a voltage source (16), d) the electrodes (3, 4) being adapted to have connected between them, a current measuring means (17) to monitor a discharge current which constitutes a function relating to the vacuum pressure to be measured,
   e) at least one permanent magnet ring (1) surrounding the coaxial electrode (3, 4) arrangement, having a magnetization direction (13) substantially radially to the axis, and comprising a soft-magnetic yoke (2) surrounding the permanent magnet ring (1), characterized in that said yoke (2) extends axially away from the permanent magnet ring (1) on both sides, and extends in a radial direction towards the axis (7) and the first electrode (3) on both sides upon a predetermined distance (d) from the permanent magnet ring (1), wherein said first electrode (3) forms the outer electrode of the coaxial arrangement of the electrodes (3, 4), such that the yoke (2) forms two annular poles (9a, b) on both sides of the permanent magnet ring (1) and spaced apart therefrom, from which at least a part of the field lines of the permanent magnet ring (1) forms a closed loop within the measuring chamber (20), penetrating the first electrode (3), wherein, in particular, inside the measuring chamber (20) an annular tunnel-like magnetic field (14) on top of the first electrode (3) is generated.

2. The measuring cell according to claim 1, characterized in that the outer electrode (3) is a cathode and the inner electrode (4) is an anode.

3. The measuring cell according to claim 1, characterized in that, in a cross section, along which the axis (7) is extending, the yoke (2) is at least partially arcuated directed towards the first electrode (3) in a radial direction.

4. The measuring cell according to claim 1, characterized in that, in a cross section along which the axis (7) is extending, the yoke (2) is at least partially tilted, in particular rectangular, directed towards the first electrode (3) in a radial direction.

5. The measuring cell according to claim 1, characterized in that at least two permanent magnet rings (1) having opposite directions of magnetization (13) are arranged inside the yoke (2), having both poles (9a, b) spaced apart from each other in axial direction, wherein each permanent magnet ring pair forms a further annular and tunnel-like magnetic field (14) on the top of the first electrode (3).

6. The measuring cell according to claim 1, characterized in that inside the yoke (2) at least two permanent magnet rings (1) are arranged having poles (9a, b) spaced apart from each other in axial direction.

7. The measuring cell according to claim 1, characterized in that the housing (10) encompasses the permanent magnet ring (1) comprising the yoke (2), and both electrodes (3, 4).

8. The measuring cell according to claim 7, characterized in that the yoke (2) forms a part of the housing (10).

9. The measuring cell according to claim 1, characterized in that the housing (10) is arranged between the first electrode (3) and the permanent magnet ring (1) comprising the yoke (2), such that the permanent magnet ring (1) and the yoke (2) are arranged to be separated from the vacuum.

10. The measuring cell according to claim 1, characterized in that the first electrode (3) is formed as the housing (10).

11. The measuring cell according to claim 1, characterized in that the at least one permanent magnet ring (1) is arranged inside the yoke (2) such to be spaced apart unequally in relation to the poles (9a, b) in axial direction.

12. The measuring cell according to claim 1, characterized in that the at least one permanent magnet ring (1) is arranged inside the yoke (2) such to be displaceable in relation to the poles (9a, b) in axial direction.

13. The measuring cell according to claim 1, characterized in that soft magnetic conductive means (6) are arranged in the area comprising the inner pole of the permanent magnet ring (1), directed in radial direction towards the axis (7).

14. The measuring cell according claim 1, characterized in that ferromagnetic conductive means (5a, 5b) are arranged in the area comprising at least one of the inner poles (9a, b) of the yoke (2), directed in radial direction towards the axis (7).

15. The measuring cell according to claim 13, characterized in that the soft magnetic conductive means (6, 5a, 5b) are formed disk-like.

16. The measuring cell according to claim 1, characterized in that the ferromagnetic conductive means (6, 5a, 5b) comprise openings adapted to feed-through the second electrode (4) and/or to allow passage of measuring gas.

17. The measuring cell according to claim 1, characterized in that the second electrode (4) is formed rod-like.

* * * * *